US005773158A

United States Patent [19]

Sawamura et al.

[11] Patent Number: 5,773,158

[45] Date of Patent: Jun. 30, 1998

[54] RAPID TEMPERATURE RISE HEATER ELEMENT

[75] Inventors: Kentaro Sawamura; Etsuo Mitsuhashi, both of Chiba; Masaru Nanao, Akita; Nobuyuki Miki, Chiba; Masahiro Kitajima, Akita; Masatada Yodogawa, Tokyo, all of Japan

[73] Assignee: TDK Corporation, Tokyo, Japan

[21] Appl. No.: 579,422

[22] Filed: Dec. 27, 1995

[30] Foreign Application Priority Data

Dec. 27, 1994 [JP] Japan .................................... 6-326432

[51] Int. Cl.$^{6}$ ........................................................ B32B 9/00

[52] U.S. Cl. .......................... 428/699; 428/446; 428/448; 428/698; 428/701; 428/702

[58] Field of Search .................................... 428/699, 701, 428/702, 698, 446, 448; 361/257

[56] References Cited

U.S. PATENT DOCUMENTS 4,644,133 2/1987 Atsumi .................................... 219/270

*Primary Examiner*—Timothy Speer

*Attorney, Agent, or Firm*—Oblon, Spivak, McClelland, Maier & Neustadt, P.C.

[57] ABSTRACT

The invention provides a rapid temperature rise heater element comprising an exothermic section (1) and a lead section (2), the exothermic section (1) comprising an exothermic section conductor of ceramic material which includes at least four stacked exothermic section conductive layers (1*a*) with an exothermic section insulating layer (1*c*) of ceramic material interposed therebetween and connections (1*b*) each for connecting adjacent exothermic section conductive layers (1*a*). The lead section (2) includes first and second lead section conductive layers (2*a* and 2*b*) electrically connected to the uppermost and lowermost exothermic section conductive layers (1*a*), respectively, the first and second lead section conductive layers (2*a* and 2*b*) being stacked with a lead section insulating layer (2*c*) of ceramic material interposed therebetween. A durable rapid temperature rise heater element can be efficiently fabricated at low cost while maintaining heater performance.

11 Claims, 5 Drawing Sheets

(a)

(b)

(c)

(d)

(e)

(f)

(a)

(b)

(c)

(d)

(e)

(f)

RAPID TEMPERATURE RISE HEATER ELEMENT

BACKGROUND OF THE INVENTION

1. Field of the Invention

This invention relates to a rapid temperature rise heater element.

2. Prior Art

Known examples of rapid temperature rise heater element are those disclosed in Japanese Patent Publication (JP-B) Nos. 28467/1989 and 61832/1992.

The rapid temperature rise heater element disclosed in JP-B 28467/1989 constitutes a glow plug for use in automotive Diesel engines. It is prepared by charging a hot press mold with a source powder of silicon carbide (SiC) having a well-known sintering aid (e.g., $B_4C$ and $Al_2O_3$) added thereto, burying a linear body of a high-melting metal material mainly of tungsten, molybdenum or the like on the source powder at a predetermined position, and firing under pressure at about 2,000° C. by a hot press method. Voltage is applied across exposed opposite ends of the linear body to generate heat.

The rapid temperature rise heater element disclosed in JP-B 61832/1992 is an electric resistor which is as a whole constructed from 30 to 70% by volume of a nitride selected from the group consisting of silicon nitride, aluminum nitride, boron nitride, and mixtures thereof, 10 to 45% by volume of silicon carbide, and 5 to 50% by volume of molybdenum disilicide, has a density of at least 85% of the theoretical density, and includes an exothermic zone and a non-exothermic end portion of different compositions. More particularly, a material providing a high electrical resistance upon sintering and another material providing a low electrical resistance upon sintering are formed as two layers which are hot press fired. The fired body is machined in a direction perpendicular to the direction of the layers to provide a U shape. Voltage is applied across the two free legs of the U shape whereby heat is generated at the connecting portion.

The rapid temperature rise heater element of JP-B 28467/1989 is prepared by hot press firing the source ceramic powder and the linear body such that the linear body serving as a heater is buried in the ceramic compact. Then heater elements must be manufactured one by one in a substantial sense. The manufacturing process is less efficient and requires a long time and a high cost. And the buried heater is low in thermal efficacy as compared with a heater exposed at the surface of a structure.

Also the rapid temperature rise heater element of JP-B 61832/1992 is prepared by machining a sintered conductive body of two layers having different resistance values into a predetermined shape, typically a U shape. It suffers from the problems of an increased processing cost and poor manufacturing efficiency since a sintered body of ceramic material having high hardness must be machined.

A similar ceramic heater is known from Japanese Patent Application Kokai (JP-A) No. 104581/1986. Also in this case, ceramic heaters must be manufactured one by one if they are U shaped. The problem is that heaters are inefficient to manufacture and expensive.

Furthermore, prior art ceramic heaters take more than 10 seconds until 1,400° C. is reached and are less durable in that their electrical resistance deteriorates during long term operation.

DISCLOSURE OF THE INVENTION

An object of the present invention is to provide a rapid temperature rise heater element which can be efficiently manufactured at low cost and is durable while maintaining heater performance.

These and other objects are achieved by the present invention which is defined below as (1) to (11).

(1) A rapid temperature rise heater element comprising an exothermic section and a lead section, said exothermic section comprising an exothermic section conductor of ceramic material which includes at least four stacked exothermic section conductive layers with an exothermic section insulating layer of ceramic material interposed therebetween and exothermic section conductive layer connections each for connecting adjacent exothermic section conductive layers, each of the exothermic section conductive layers excluding the uppermost and lowermost ones being electrically connected at one end to an upper adjacent exothermic section conductive layer and at another end to a lower adjacent exothermic section conductive layer so that the exothermic section conductive layer is alternately folded as a whole, said lead section comprising a lead section conductor of ceramic material which includes first and second lead section conductive layers electrically connected to the uppermost and lowermost exothermic section conductive layers, the first and second lead section conductive layers being stacked with a lead section insulating layer of ceramic material interposed therebetween.

(2) The rapid temperature rise heater element of (1) wherein the exothermic section conductive layer has a thickness of 10 to 200 $\mu$m, and the first and second lead section conductive layers each have a thickness which is greater than the thickness of the exothermic section conductive layer by a factor of 3 to 100.

(3) The rapid temperature rise heater element of (1) wherein the exothermic section and lead section conductors contain molybdenum disilicide and alumina or molybdenum disilicide, alumina, and silica, the molybdenum disilicide being present in a percent volume occupation of 48 to 97%.

(4) The rapid temperature rise heater element of (3) wherein the percent volume occupation of molybdenum disilicide in the exothermic section conductor divided by the percent volume occupation of molybdenum disilicide in the lead section conductor ranges from 0.53 to 1.0.

(5) The rapid temperature rise heater element of (3) wherein the exothermic section conductor and/or the lead section conductor contains at least one of titanium carbide and titanium boride, the amount of titanium carbide and titanium boride combined being 0.1 to 5% by weight based on the amount of molybdenum disilicide, alumina, and silica combined.

(6) The rapid temperature rise heater element of (1) wherein the exothermic section conductor has an electrical resistance which is greater than the resistance of the lead section conductor by a factor of at least 5.

(7) The rapid temperature rise heater element of (1) wherein at least the portion of the exothermic section surface where the exothermic section conductor is exposed is coated with a protective layer.

(8) The rapid temperature rise heater element of (7) wherein at least the portion of the lead section surface where the lead section conductor is exposed is coated with a protective layer.

(9) The rapid temperature rise heater element of (1) wherein first and second protective conductive layers are stacked above and below the uppermost and lowermost exothermic section conductive layers, respectively, with an insulating layer interposed therebetween, the uppermost exothermic section conductive layer is connected to the first lead section conductive layer through the first protective conductive layer, the lowermost exothermic section conductive layer is connected to the second lead section conductive layer through the second protective conductive layer, and each of the first and second protective conductive layers consists of two stacked conductive layers with a protective insulating layer interposed therebetween, the two conductive layers being in parallel connection.

(10) The rapid temperature rise heater element of (1) which is manufactured by alternately laying conductive ceramic material layers and electrically insulating ceramic material layers, followed by cutting and firing.

(11) The rapid temperature rise heater element of (10) which is manufactured by alternately laying conductive ceramic material layers and electrically insulating ceramic material layers such that the conductive layer is enclosed with the insulating layer, followed by firing, at least the surface of the exothermic section being coated with a protective layer.

A predominant portion or the entirety of the rapid temperature rise heater element according to the invention can be prepared simply by stacking ceramic green sheets or stacking layers by a printing technique and cutting the stack into a strip shape, followed by firing. Since a plurality of elements can be integrally and concurrently prepared until the firing step and the subsequent steps are simply to cut the green material into strips and to fire them, the process is efficient and cost effective to manufacture the elements.

The rapid temperature rise heater element disclosed in JP-B 61832/1992 has a U shape containing a notched space inside and is thus insufficient in strength. This requires the two perpendicular legs to have a substantial thickness, resulting in a large size as a whole. This element is less durable.

The inventors proposed in Japanese Patent Application Nos. 200314/1993 and 187782/1994 a rapid temperature rise heater element of the structure obtained by using an electrically insulating sintered ceramic layer and integrating therewith an electrically conductive sintered ceramic layer to serve as a heater and a lead section. The rapid temperature rise heater element of this proposal has the advantages of high strength and possible size reduction, but suffers from the problem that since a large amount of insulating material is incorporated into the exothermic section conductive layer to increase its electrical resistance higher than the lead section, the conductive material is vulnerable to oxidation and experiences a great change of resistance after long-term operation.

In contrast, the rapid temperature rise heater element of the invention includes an exothermic section conductor obtained by stacking exothermic section conductive layers with an exothermic section insulating layer interposed therebetween and electrically connecting adjacent exothermic section conductive layers through a conductive connection, whereby the exothermic section conductor is alternately folded as a whole. First and second lead section conductive layers are electrically connected to opposite ends of the exothermic section conductor, thereby integrating the exothermic section and the lead section. The element is generally obtained in an integral plate form as a whole. This results in higher mechanical strength. Also, a choice from a wider range is allowed for the thickness of the exothermic section conductive layer and the current path length to increase the degree of freedom for the design of the electrical resistance, enabling size reduction. As a consequence of size reduction, the amount of energy required for a temperature rise can be reduced. Since the overall length of the exothermic section conductor can be increased despite the small size, it is easy to match a coefficient of thermal expansion of the exothermic section conductive layer with that of the lead section conductive layer by forming them of an identical material. As a result, there is accomplished a rapid temperature rise heater element which is resistant to thermal impacts and fully durable against repetitive rapid temperature rises over a long period.

Where it is desired to increase the ultimate temperature relative to the applied voltage, at least one of titanium carbide and titanium boride is contained in the conductive layer. Then the NTC effect suppresses the PTC effect, enabling to control the ultimate temperature high. The addition of titanium boride can improve flame resistance.

It is noted that JP-A 86086/1990 discloses a heater comprising a sintered body including conductive layers integrally formed above, below and at one end of an electrically insulating layer, and lead terminals attached to the sintered body. However, since the lead terminals are not integrally formed, the entire element elevates its temperature as an exothermic body. Then the joint of the lead terminal must withstand high temperature. However, it is very difficult and impractical to maintain the bond strength of the joint of the lead terminal even during heating at high temperature. Although it can be envisioned to achieve contact under pressure using a spring or similar mechanical means, few materials withstand high temperature and such a material if any is not expected to last long. It may also be envisioned to bond the joint with cement. In any event, a temperature rise at the joint is unavoidable. Furthermore, the composition of the conductive layer in the patent reference cited herein, which is different from the preferred composition used in the present invention, is less resistant to oxidation and has a significant electrical resistance variation.

Also, the composition of the sintered body of the rapid temperature rise heater element disclosed in JP-B 28467/1989 and the composition of the conductive sintered body of the rapid temperature rise heater element disclosed in JP-B 61832/1992, which are different from the preferred composition used in the present invention, are less resistant to oxidation and have a significant electrical resistance variation. Although the composition of the ceramic heater disclosed in JP-A 104581/1986 overlaps the preferred composition used in the present invention, there are described no examples falling in the preferred composition range used in the present invention.

BEST MODE FOR CARRYING OUT THE INVENTION

The construction of the present invention is described below in detail.

The rapid temperature rise heater element of the invention is fabricated by laying layers of electrically conductive and insulating ceramic materials by a sheet stacking technique or printing technique followed by firing. It preferably has a rectangular plate shape as a whole although it may take another shape such as a cylindrical shape.

Figure 1:
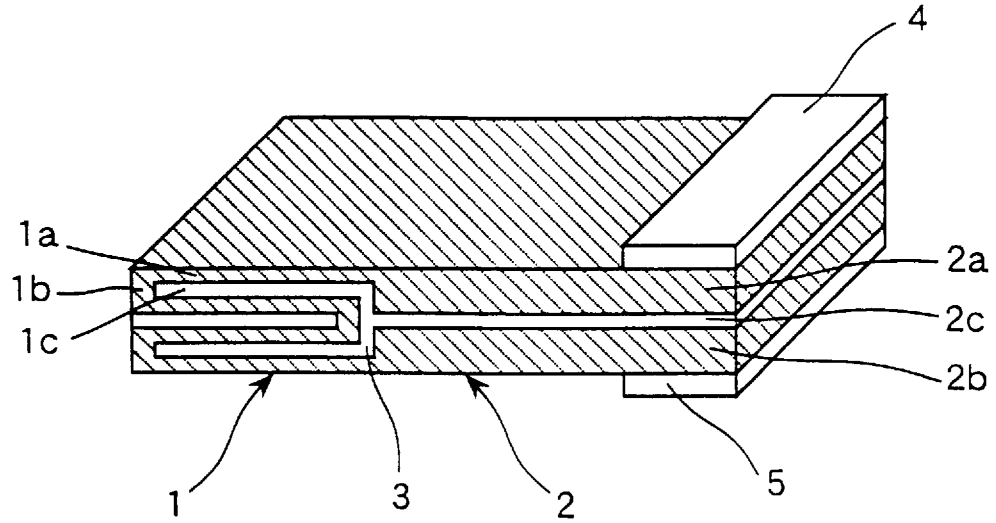
FIG. 1 is a perspective view showing an exemplary arrangement of a rapid temperature rise heater element according to the present invention.

FIG. 1 illustrates an exemplary arrangement of a rapid temperature rise heater element according to the invention. The rapid temperature rise heater element shown in FIG. 1 includes an exothermic section 1 and a lead section 2.

The exothermic section 1 has an exothermic section conductor made of ceramic material. The exothermic section conductor includes at least four stacked exothermic section conductive layers 1*a* with an exothermic section insulating layer 1*c* of ceramic material interposed therebetween, and exothermic section conductive layer connections 1*b* each connecting adjacent exothermic section conductive layers 1*a* to each other. More particularly, each of the exothermic section conductive layers 1*a* excluding the uppermost and lowermost ones is electrically connected to an upper adjacent exothermic section conductive layer at one end and electrically connected to a lower adjacent exothermic section conductive layer at another end. That is, the exothermic section conductive layer 1*a* is alternately folded as a whole. As a consequence, a current path extending from the top to the bottom or from the bottom to the top is formed in the exothermic section in its entirety.

The lead section 2 has a lead section conductor made of ceramic material. The lead section conductor includes a first lead section conductive layer 2*a* and a second lead section conductive layer 2*b* which are electrically connected to the uppermost and lowermost exothermic section conductive layers 1*a*, respectively. The first and second lead section conductive layers 2*a* and 2*b* are stacked with a lead section insulating layer 2*c* of ceramic material interposed therebetween.

A heater/lead boundary insulator 3 is disposed between the exothermic section 1 and the lead section 2. The heater/lead boundary insulator 3 plays the role of preventing short-circuiting between the first and second lead section conductive layers 2*a* and 2*b* and the exothermic section conductor.

The above-mentioned arrangement provides a circuit having a current path extending from the first lead section conductive layer 2*a* to the second lead section conductive layer 2*b* through the exothermic section conductor.

Figure 2:
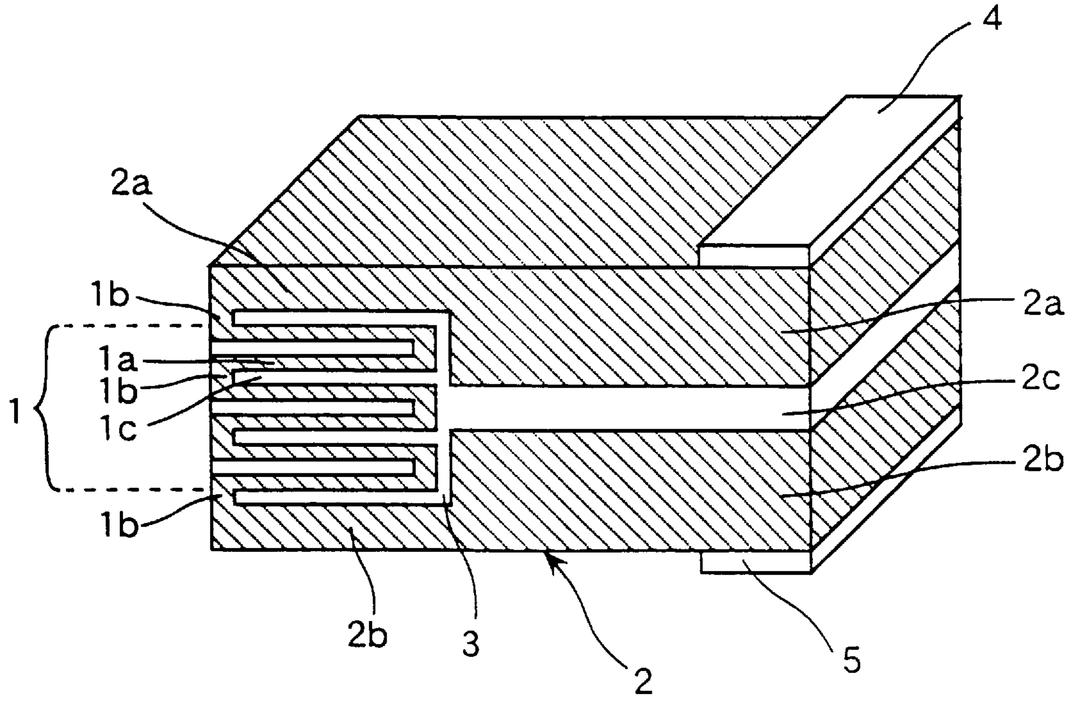
FIG. 2 is a perspective view showing another exemplary arrangement of a rapid temperature rise heater element according to the present invention.

FIG. 2 illustrates another exemplary arrangement of a rapid temperature rise heater element according to the invention. In the arrangement shown in FIG. 2, first and second lead section conductive layers 2*a* and 2*b* extend to the top and bottom of an exothermic section 1 and are electrically connected to uppermost and lowermost exothermic section conductive layers 1*a* through exothermic section conductive layer connections 1*b*, respectively. Both the lead section conductive layers are thicker than the exothermic section conductive layer 1*a*. Although the rapid temperature rise heater element according to the invention has the likelihood that heating during the use of the element or heat treatment to be carried out prior to the use of the element for stabilization purposes causes the conductive layers near the element surfaces to be oxidized to lower conductivity to invite electrical disconnection, the life of the element can be prolonged by providing relatively thick conductive layers outside the exothermic section as lead section conductive layers as shown in FIG. 2. In this arrangement, the thickness of the lead section conductive layers where they extend so as to sandwich the exothermic section therebetween is preferably greater than the thickness of the exothermic section conductive layer by a factor of 2 to 4. A thickness factor of less than 2 would be less effective for prolonging the element life whereas a thickness factor of more than 4 would lead to a greater heat capacity and hence, a slower temperature rise rate, resulting in a temperature gradient occurring in the region which induces thermal stresses.

Figure 3:
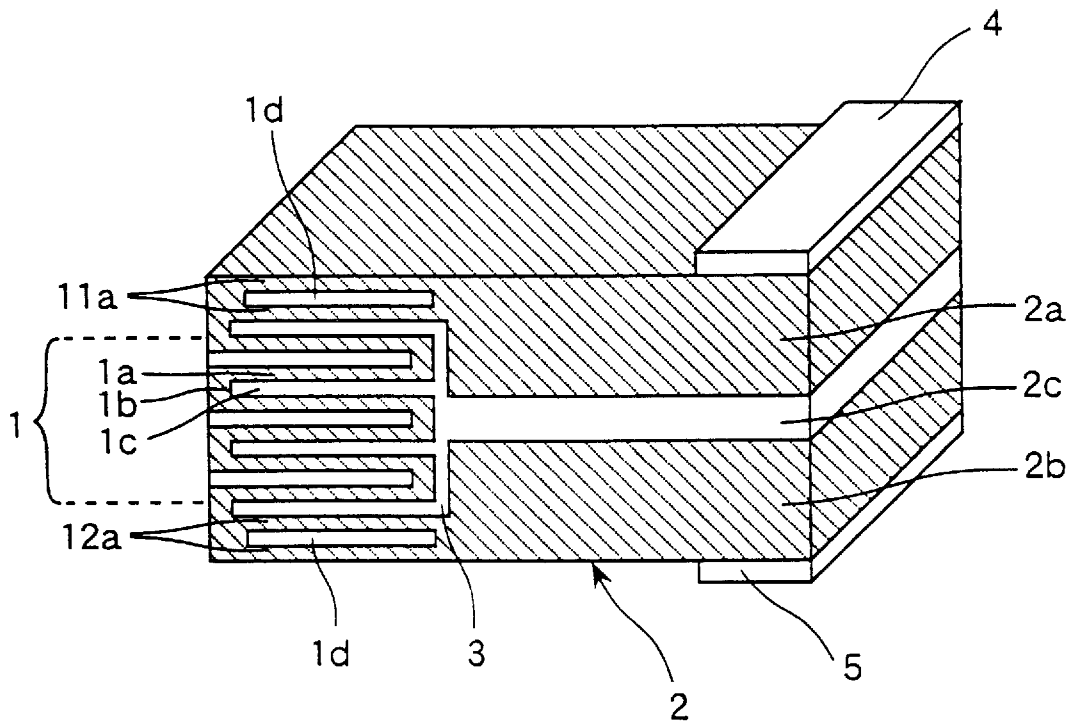
FIG. 3 is a perspective view showing a further exemplary arrangement of a rapid temperature rise heater element according to the present invention.

FIG. 3 illustrates a further exemplary arrangement of a rapid temperature rise heater element according to the invention. In the arrangement shown in FIG. 3, first and second protective conductive layers 11*a* and 12*a* are provided above and below the uppermost and lowermost exothermic section conductive layers 1*a*, respectively, with an insulating layer interposed therebetween. The uppermost exothermic section conductive layer 1*a* is connected to the first lead section conductive layer 2*a* via the first protective conductive layer 11*a*, and the lowermost exothermic section conductive layer 1*a* is connected to the second lead section conductive layer 2*b* via the second protective conductive layer 12*a*. Each of the first and second protective conductive layers 11*a* and 12*a* consists of two stacked conductive layers having a protective insulating layer 1*d* interposed therebetween and connected in parallel to each other. In the first and second protective conductive layers, the layer disposed adjacent the element surface is effective for preventing oxidation of the exothermic section conductive layer. Although that conductive layer disposed adjacent the element surface is oxidized to incur minute cracks during operation, the presence of the protective insulating layer 1*d* prevents further oxidation. Also if the interface between the insulating layer and the conductive layer is exposed at the element surface, oxygen is likely to penetrate along the interface. The illustrated arrangement suppresses penetration of oxygen since the protective insulating layer 1*d* is not exposed at the upper surface and side surface (left surface in the illustrated arrangement) of the element. Each of the first and second protective conductive layers is a parallel connection of two conductive layers. If the conductive layer disposed adjacent the element surface substantially loses its conductivity due to the occurrence of cracks by oxidation, then each of the first and second protective conductive layers increases its electrical resistance as a whole so that the conductive layer disposed inside the element may generate heat and play the role of an exothermic section conductive layer. In this way, the arrangement having the first and second protective conductive layers is successful in extending the element life.

In the arrangement of FIG. 3, the thickness of the protective insulating layer 1*d* is preferably greater than the thickness of the exothermic section conductive layer by a factor of 0.5 to 1. A too thin protective insulating layer would be less effective for the above-mentioned effect whereas a too thick protective insulating layer would be rather reduced in oxidation prevention. Since the conductive layer generates heat, but the protective insulating layer does not, a too thick protective insulating layer would cause a greater difference in expansion to occur between these layers during operation of the element, which adversely affects the close contact therebetween, allowing for easy progress of oxidation. It is preferred that the two conductive layers of each protective conductive layer have a thickness equal to that of the exothermic section conductive layer.

The first and second lead section conductive layers 2*a* and 2*b* are formed on their outer surface with terminal electrodes 4 and 5, respectively. The terminal electrodes 4 and 5 are made of a metal and formed on the surface of the first and second lead section conductive layers at a position remotest from the exothermic section. This is to prevent the terminal electrodes from being heated to elevated temperature. If the temperature of the lead section conductive layers can be maintained below the heat resistant temperature of the terminal electrodes, the terminal electrodes may be disposed at any position on the lead section conductive layers.

The rapid temperature rise heater element according to the invention is designed such that the temperature rise time from room temperature to 1,000° to 1,500° C. is within 10 seconds, preferably 1 to 5 seconds. The electrical resistance of the rapid temperature rise heater element according to the invention is generally set within the range of 0.5 to 2,000Ω although it varies with a power used and the range of an applied voltage. The electrical resistance of the exothermic section conductor is at least 5 times, preferably about 10 to about 500 times the resistance of the lead section conductor. As a consequence, temperature may not rise so high where the terminal electrodes are located.

In the rapid temperature rise heater element according to the invention, the exothermic section conductive layer preferably has a thickness of 10 to 200 μm, more preferably 10 to 100 μm, most preferably 20 to 60 μm. The thickness of the lead section conductive layer is preferably set to be 3 to 100 times, more preferably 10 to 60 times the thickness of the exothermic section conductive layer.

An exothermic section conductive layer with a thickness of less than 10 μm would be less resistant to oxidation. An exothermic section conductive layer with a thickness of more than 200 μm would have a too low electrical resistance, which means that the number of stacked exothermic section conductive layers must be increased in order to provide a desired resistance value. The element is then increased in size, which in turn, lowers the heating rate. An exothermic section conductive layer with a thickness of from more than 100 μm to 200 μm is acceptable on use, but leads to a larger size of the element. An exothermic section conductive layer with a thickness of from 10 μm to less than 20 μm is acceptable on use, but not perfect in oxidation resistance. An exothermic section conductive layer with a thickness of from more than 60 μm to 100 μm is acceptable on use, but leads to a somewhat larger size of the element. An exothermic section conductive layer with a thickness of from 20 to 60 μm is best in both oxidation resistance and heating rate.

If the factor by which the thickness of the lead section conductive layer is greater than the thickness of the exothermic section conductive layer is less than 3, the lead section would also generate heat because of a smaller difference in electrical resistance between both the conductive layers. If the thickness factor is more than 100, the lead section is so thick that the heating rate might be retarded by a heat loss due to heat transfer. Where the thickness factor is from 3 to less than 10, the element operates without a significant problem. Where the thickness factor is from 10 to 60, the problem of heat generation in the lead section is eliminated and the heating rate is high.

The number of exothermic section conductive layers 1*a* stacked is 4 or more as mentioned above. A number of stacked layers of less than 4 would lead to a low electrical resistance, poor mechanical strength and poor oxidation resistance. A number of stacked layers of more than 100 would increase the size and thermal capacity of the element which not only lowers the heating rate, but also causes cracks to occur during rapid temperature rise.

The total thickness of the element (in the direction of stacking the conductive layers) is generally about 0.5 to 2 mm although it may be suitably determined such that the element as a whole may not be too large in size, by taking into account the above-mentioned number of stacked conductive layers and their preferred thickness. The element is not particularly limited in planar dimensions although the element generally has a width of about 1 to 3 mm and a length of about 20 to 60 mm. The length of the element used herein is a dimension in a lateral direction in the illustrated embodiment. The length of the exothermic section and lead section may be suitably determined by taking into account the ratio of electrical resistance between the sections and the distance between the exothermic section and the terminal electrodes.

It is noted that the exothermic section insulating layer generally has a thickness of 10 to 60 μm although it may be suitably determined insofar as sufficient insulation is achieved and the exothermic section is not prevented from temperature rise. The lead section insulating layer generally has a thickness of at least 30 μm in order to achieve sufficient insulation.

The lead section includes three layers in entirety as shown in the figures. If desired, the thickness of the first and second lead section conductive layers may be adjusted by providing more than one lead section insulating layer.

The exothermic section and lead section conductors preferably contain molybdenum disilicide and alumina or contain molybdenum disilicide, alumina, and silica. Molybdenum disilicide is used since it is well resistant to oxidation at elevated temperatures. Alumina is used since it has a coefficient of thermal expansion close to that of molybdenum disilicide and is well resistant to high temperature. Preferably silica is contained in the conductor as a result of using mullite or sillimanite as a conductor material. Mullite and sillimanite each are formed of silica and alumina and less reactive to molybdenum disilicide than alumina. Then use of at least one of mullite and sillimanite as a conductor material can suppress a percent change of electrical resistance of the conductor during operation of the element. Note that silica, if contained, functions to reduce a coefficient of thermal expansion. Where silica is contained in the conductor, it is preferred that silica is also contained in an insulating layer for matching of a coefficient of thermal expansion. The content of silica in the conductor and insulating layer is up to 52% by volume calculated as mullite+sillimanite.

The content of molybdenum disilicide in the exothermic section and lead section conductors as expressed in % by volume is preferably 48 to 97%, more preferably 50 to 95%, most preferably 55 to 90%. With a content of less than 48%, molybdenum disilicide would bond with each other to an insufficient extent, resulting in poor oxidation resistance and a greater electrical resistance variation after firing. A content of more than 97% would provide less compatibility with the adjoining insulating layer, causing occurrence of cracks. A content of from 48% to less than 50% is usable, but leads to slightly poor oxidation resistance and an electrical resistance variation after firing. A content of from more than 95% to 97% is usable, but tends to offer a lower electrical resistance and less compatibility to the insulating layer. With a content of from 50% to less than 55%, oxidation resistance and electrical resistance variation after firing are somewhat improved over the content of from 48% to less than 50%. A content of from more than 90% to 95% offers a higher electrical resistance than the content of more than 95% to 97%, allowing the number of stacked layers to be reduced and the element to be more compact. A content of 55 to 90% is the optimum range wherein oxidation resistance is ensured, the heating rate is high, and few cracks occur.

A percent by volume content of molybdenum disilicide within the above-mentioned range ensures a negative percent change of resistivity during operation, that is, a decline of resistivity with time. However, resistivity ceases to decline after about 50 hours of heating and remains substantially unchanged thereafter. When it is desired to suppress a resistivity change with time, the heat treatment for stabilizing properties to be described later is preferably carried out in advance.

Although the exothermic section and lead section conductors preferably have substantially the same composition for matching of a coefficient of thermal expansion, one composition may be deviated from the other in order to suppress temperature rise in the lead section. It is preferred for increasing thermal impact resistance that the respective conductors have such compositions that the percent by volume occupation of molybdenum disilicide in the exothermic section conductor divided by the percent by volume occupation of molybdenum disilicide in the lead section conductor may range from 0.53 to 1.0.

Where silica is contained, preferably the conductor further contains magnesia. Magnesia serves as a sintering aid. The amount of magnesia added is preferably 0.1 to 1.0% by weight based on silica plus alumina. A too small amount of magnesia would be less effective whereas a too large amount of magnesia would allow MgO to remain in the element to detract from flame resistance characteristics.

In the exothermic section conductor and/or lead section conductor, at least one of titanium carbide and titanium boride may be contained. Where only molybdenum disilicide, alumina and silica are used in the conductor, there is a likelihood that the electrical resistance at 1,500° C. is greater than that at room temperature by a factor of about 12, the so-called PTC effect is strong, and the ultimate temperature cannot be increased with a certain voltage. However, inclusion of at least one of titanium carbide and titanium boride is effective for suppressing the PTC effect due to the NTC effect thereof and enables to control the electrical resistance at 1,500° C. to fall in the range of 4 to 12 times the resistance at room temperature. The content of titanium carbide and titanium boride combined is preferably 0.1 to 5% by weight, more preferably 1 to 2% by weight based on the sum of molybdenum disilicide, alumina and silica. A content of less than 0.1 wt % is ineffective whereas a content in excess of 5 wt % would detract from oxidation resistance. A content of from 0.1 wt % to less than 1 wt % is usable, but less effective for PTC suppression. A content of from more than 2 wt % to 5 wt % is usable, but provides somewhat poor oxidation resistance. A content of 1 to 2 wt % ensures oxidation resistance and sufficient PTC suppression effect.

The electrical resistance of the exothermic section conductor is preferably greater than the resistance of the lead section conductor by a factor of at least 5, more preferably about 10 to about 100. With a factor of less than 5, the lead section would also generate heat during current conduction, reducing heat efficiency and deteriorating the terminal electrodes connected to the lead section.

The exothermic section insulating layer, lead section insulating layer, and heater/lead boundary insulator are preferably composed of an insulating first component in the form of a metal oxide and a conductive second component in the form of a metal silicide and/or metal carbide. It is acceptable to use only the insulating first component although inclusion of the conductive second component is effective for increasing the bond between layers, resulting in improved durability. The metal oxide used as the first component is at least one selected from the group consisting of alumina, zirconium oxide, chromium oxide, titanium oxide, tantalum oxide, magnesium aluminum oxide, and mullite, with the alumina being especially preferred. The metal silicide used as the second component is at least one selected from molybdenum, tungsten, and chromium silicides, and the metal carbide is at least one selected from silicon and titanium carbides. Among these, it is preferred to use silicides, especially molybdenum disilicide. The compositional ratio of insulating first component to conductive second component in the insulating layer or insulator is preferably from 10:0 to 8:2, more preferably from 10:0 to 9.3:0.7 by volume. If the conductive second component exceeds 20% by volume, the insulator would lose the insulation by the insulating first component and tend to be conductive.

In the rapid temperature rise heater element of the invention, the exothermic section may be provided with a space for relieving stresses, if necessary. The stress relieving space substantially divides the exothermic section into two or more zones whereby stress induction is suppressed to prevent cracking or failure of the entire exothermic section. The space is preferably in the form of a slit or small apertures. With respect to the stress relieving space, reference is made to Japanese Patent Application No. 114460/1994 by the same assignee as the present invention.

Figure 4:
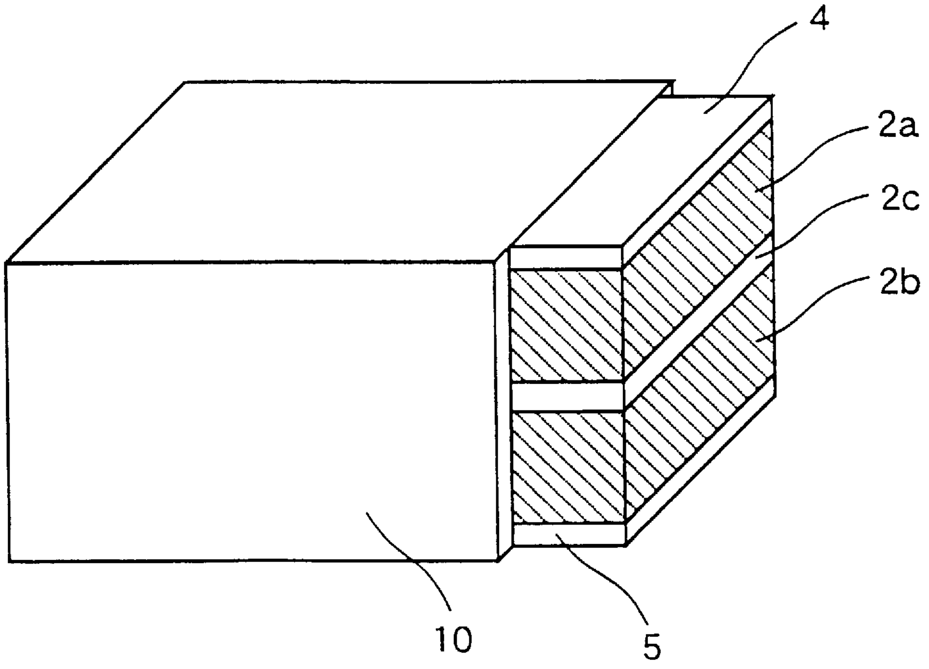
FIG. 4 is a perspective view showing a still further exemplary arrangement of a rapid temperature rise heater element according to the present invention.

The rapid temperature rise heater element of the invention favors that at least the portion of the exothermic section surface where the exothermic section conductor is exposed be covered with a protective layer and that at least the portion of the lead section surface where the lead section conductor is exposed be covered with a protective layer. FIG. 4 shows an exemplary arrangement wherein a protective layer is formed. As seen from the illustrated arrangement, no protective layer need be provided on the lead section surface in proximity to the terminal electrodes. The protective layer is not critical as long as it is chemically and thermally stable, heat resistant and oxidation resistant. The protective layer is preferably composed of at least one of silica and alumina or contains them as a main component. The protective layer preferably has a thickness of 0.1 to 100 $\mu$m, more preferably about 2 to 20 $\mu$m where silica is a main component and a thickness of 2 to 200 $\mu$m, more preferably about 5 to 100 $\mu$m where alumina is a main component.

Described below is one exemplary method for fabricating the rapid temperature rise heater element according to the invention.

At the start of fabrication, source materials for forming the exothermic section and lead section are first prepared.

This preparation is carried out by weighing alumina preferably having a mean particle size of 0.4 to 1.5 $\mu$m as an electrically insulating ceramic material and alumina preferably having a mean particle size of 0.4 to 1.5 $\mu$m and molybdenum disilicide preferably having a mean particle size of 1.0 to 5.0 μm as a conductive ceramic material and optionally mullite and sillimanite for the insulating layer and insulator so as to give a predetermined volume occupation, and adding a binder and solvent thereto. A methacrylic binder may be used as the binder. Toluene, ethanol or the like may be used as the solvent.

The thus prepared blends are mixed in ball mills, for example, into slurries. The mixing time is generally about 3 to 24 hours. The slurries are applied by a conventional doctor blade or extrusion technique to form green sheets for the insulating layer and conductive layer. The green sheets have a thickness which is previously determined by calculation such that the layers as fired may have a thickness in the desired range.

The green sheets are then stacked to form a desired structure. Layer build-up is preferably carried out by thermo-compression bonding under a pressure of about 50 to 1,500 kg/cm$^2$ and a temperature of about 50° to 100° C. Layer build-up can be done without forming sheets, that is, by repeatedly applying the respective slurries by a screen printing technique. Sheet stacking combined with printing is also acceptable.

Thereafter, the layered structure is cut into strips conforming to the final heater element configuration. This step requires cutting along the four sides of a rectangular strip at the maximum.

After cutting, discrete elements are subject to binder removal and firing. The binder removal is desirably carried out under the following conditions, for example.

Heating rate: 6°–300° C./hour, especially 30°–120° C./hour

Holding temperature: 250°–900° C., especially 300°–350° C.

Holding time: 1–24 hours, especially 5–20 hours

Atmosphere: nitrogen gas or nitrogen gas-steam mixture

The firing is desirably carried out under the following conditions, for example.

Heating rate: 300°–2000° C./hour, especially 500°–1000° C./hour

Holding temperature: 1400–1800° C., especially 1650°–1750° C.

Holding time: ½–3 hours, especially 1–2 hours

Cooling rate: 300°–2000° C./hour, especially 500°–1000° C./hour

The firing atmosphere may be vacuum, argon gas, helium gas or the like. It is desirable to avoid a nitrogen atmosphere because the exothermic section conductor, if nitrided, will have a negative temperature coefficient of electrical resistance. The binder removal and firing may be carried out either independently or continuously.

It is noted that after firing, heat treatment may be carried out for stabilizing purposes. This heat treatment is to oxidize a sub-surface portion of the conductor exposed at the element surface for restraining a rapid change of electrical resistance at an early stage after the start of operation. The sub-surface portion of the conductor which is oxidized by this heat treatment serves as a protective layer.

The method of forming a protective layer on the surface of the thus sintered body is not critical. There may be used any of the following exemplary methods including a method of carrying out heat treatment at 1,300° C. or higher in air to oxidize molybdenum disilicide exposed at the element surface and positioned near the conductor surface to form a silica layer; a method of stacking an alumina layer on the surface of the element prior to firing by sheet compression bonding or printing and firing the alumina layer together with the element; and a method of forming an alumina layer on the surface of the element as fired by chemical vapor deposition (CVD) or physical vapor deposition (PVD).

Figure 5:
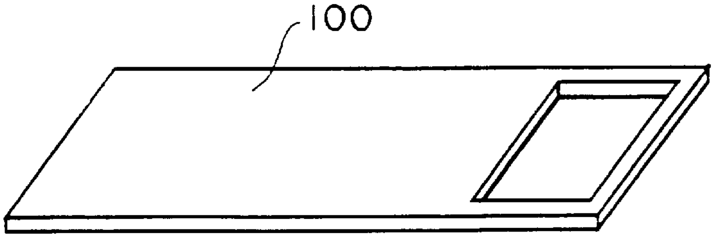
FIGS. 5(*a*) to 5(*f*) illustrate steps of a process of fabricating a rapid temperature rise heater element.
Figure 5:
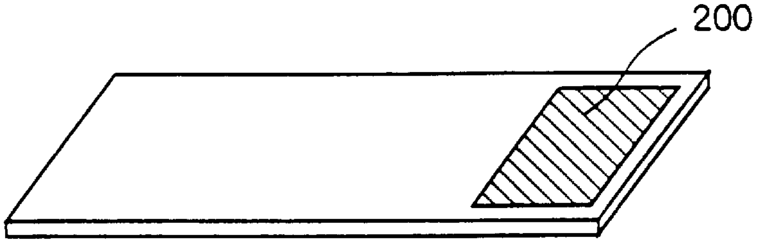
Figure 5:
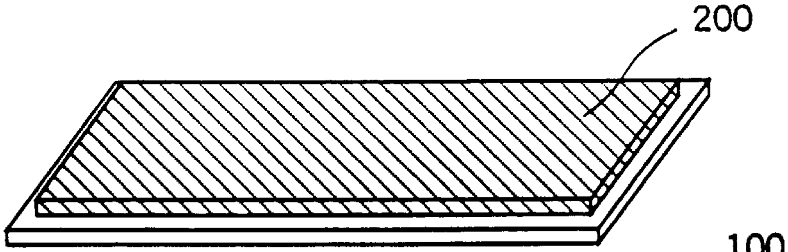
Figure 5:
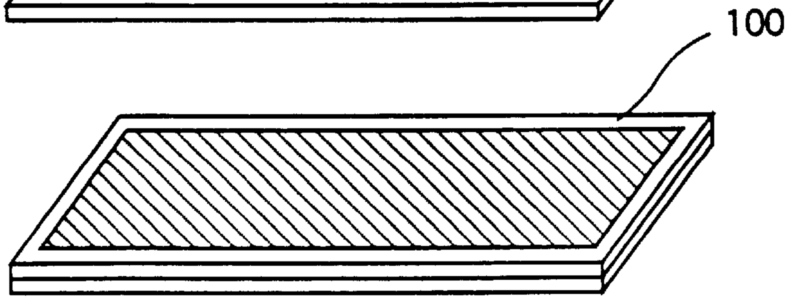
Figure 5:
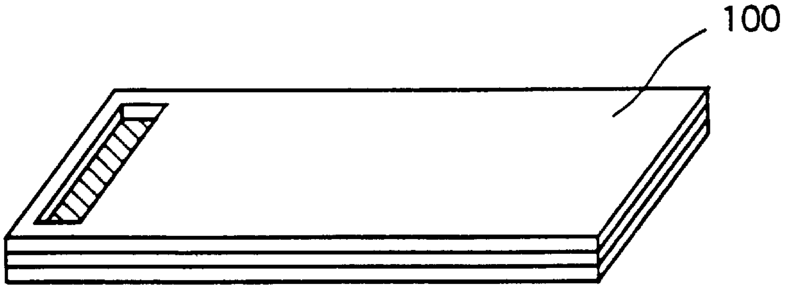
Figure 5:
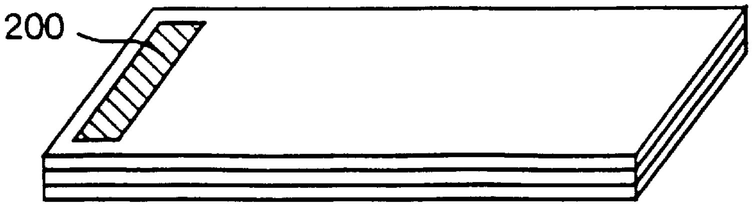

The protective layer on the element surface may be formed concurrently while the conductive ceramic material layers and insulating ceramic material layers are successively laid. In this method, as shown in FIGS. 5(*a*) to 6(*f*), the conductive ceramic material layers 200 and electrically insulating ceramic material layers 100 are laid up such that the conductive layers 200 are enclosed with the insulating layers 100. In this case, at least part of the framework insulating ceramic material layers 100 and the lowermost and uppermost insulating ceramic material layers 100 eventually form a protective layer after firing.

Figure 6:
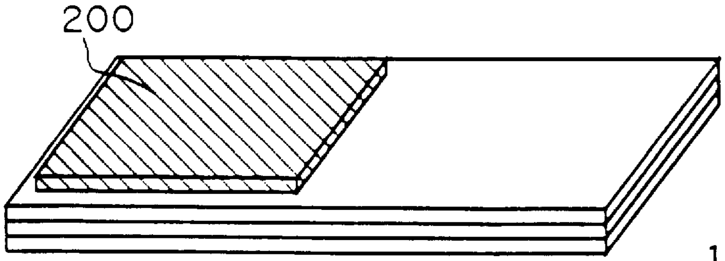
FIGS. 6(*a*) to 6(*f*) illustrate steps (subsequent to FIG. 5) of the process of fabricating a rapid temperature rise heater element.
Figure 6:
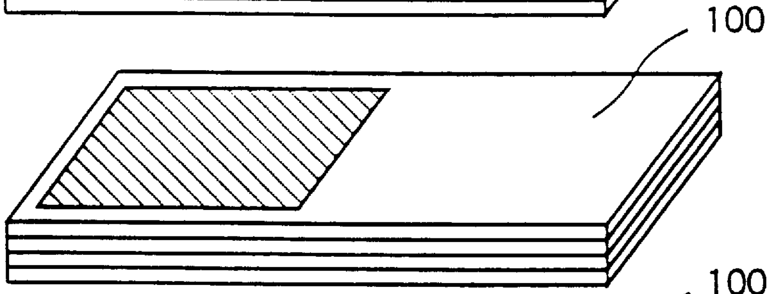
Figure 6:
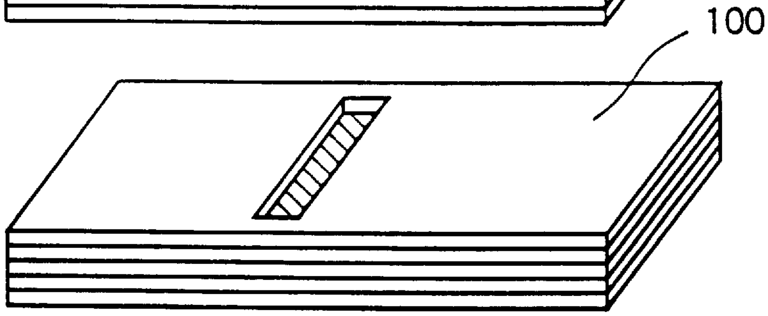
Figure 6:
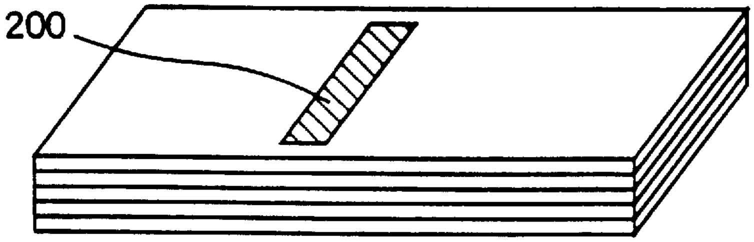
Figure 6:
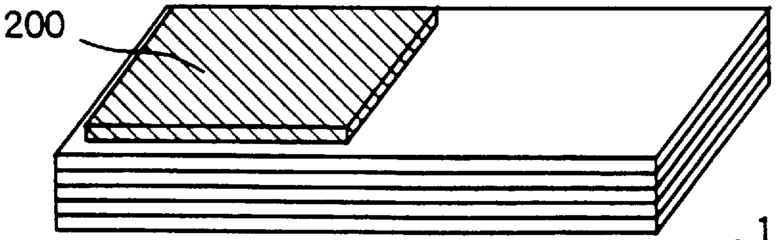
Figure 6:
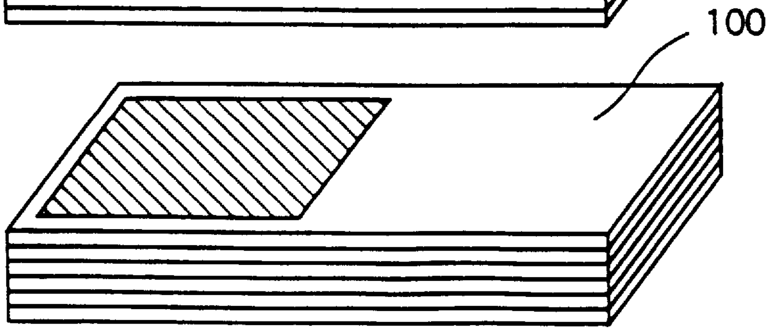
Figure 7:
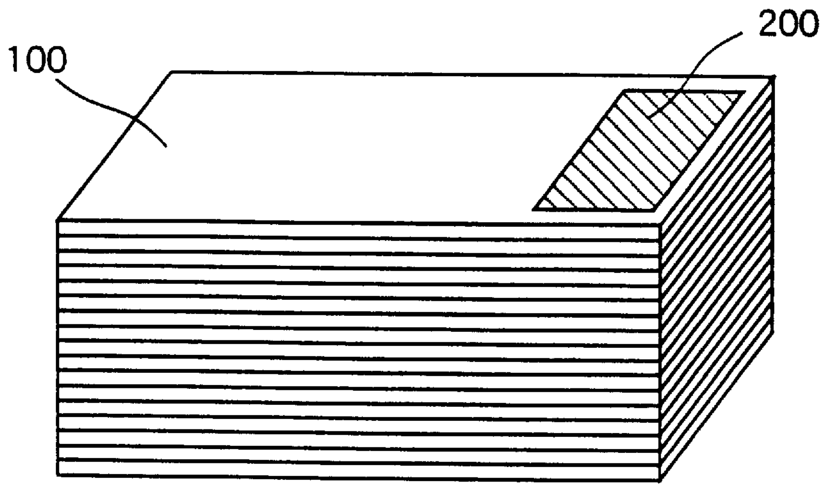
FIG. 7 is a perspective view of a multilayer structure prepared by the process shown in FIGS. 5 and 6.
Figure 8:
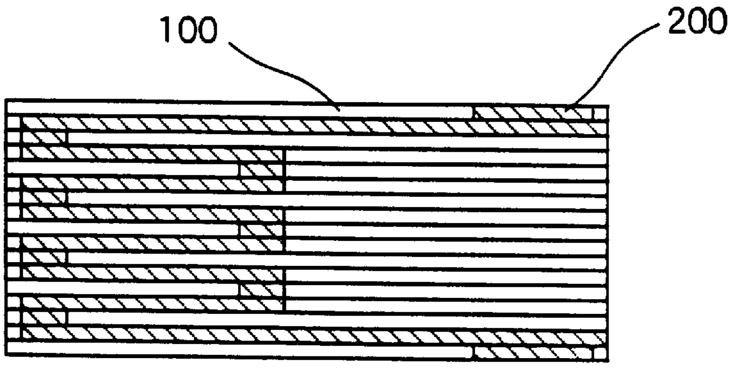
FIG. 8 is a cross-sectional view of the multilayer structure prepared by the process shown in FIGS. 5 and 6.

FIG. 5(*a*) shows an electrically insulating ceramic material layer which becomes a protective layer at the bottom of the element as well as a protective layer external to the region where a terminal electrode is connected to the lead section conductive layer. FIG. 5(*b*) shows an electrically conductive ceramic material layer 200 which corresponds to the region where a terminal electrode is connected to a lead section conductive layer FIG. 5(*c*) shows a conductive ceramic material layer 200 which becomes the lowermost exothermic section conductive layer and lower lead section conductive layer. FIG. 5(*d*) shows an insulating ceramic material layer 100 which becomes a protective layer outside the exothermic section conductive layer and lead section conductive layer. FIG. 5(*e*) shows an insulating ceramic material layer 100 which becomes the exothermic section insulating layer and lead section insulating layer as well as a protective layer outside the connection between exothermic section conductive layers. FIG. 5(*f*) shows a conductive ceramic material layer 200 which becomes the connection between exothermic section conductive layers. FIG. 6(*a*) shows a conductive ceramic material layer 200 which becomes a second exothermic section conductive layer. FIG. 6(*b*) shows an insulating ceramic material layer 100 which becomes a lead section insulating layer as well as a protective layer outside the exothermic section conductive layer. FIG. 6(*c*) shows an insulating ceramic material layer 100 which becomes an exothermic section insulating layer and lead section insulating layer as well as a protective layer outside the connection between exothermic section conductive layers. FIG. 6(*d*) shows a conductive ceramic material layer 200 which becomes the connection between exothermic section conductive layers. FIG. 6(*e*) shows a conductive ceramic material layer 200 which becomes a third exothermic section conductive layer. FIG. 6(*f*) shows an insulating ceramic material layer 100 which becomes a lead section insulating layer as well as a protective layer outside the exothermic section conductive layer. Similar steps are then repeated to successively lay insulating ceramic material layers and conductive ceramic material layers, forming a multilayer structure as shown in the perspective view of FIG. 7 and the cross-sectional view of FIG. 8, which is then fired.

It is noted that in the illustrated embodiment, the electrically insulating ceramic material layers 100 shown in FIGS. 5(*a*), 5(*e*), and 6(*c*) are green sheets while the remaining electrically insulating ceramic material layers and the conductive ceramic material layers are formed by printing. Other combinations are acceptable. The layers may be formed solely by the sheet laying technique or printing technique.

Although in the illustrated embodiment, the element is fabricated as a single unit for the sake of brevity of description, a plurality of elements are simultaneously fabricated in a common practice by using green sheets or printed patterns of insulating ceramic material layer having a plurality of frameworks, cutting the multilayer structure into element units, and firing them.

After firing, nickel or silver braze is applied and baked to the surface of the lead section conductor at predetermined positions to form terminal electrodes, completing the manufacture of a rapid temperature rise heater element. Further, the terminal electrodes may be electrically connected to lead wires or fitted in a socket.

The rapid temperature rise heater element of the invention finds use as gas igniters and has a drive voltage of about 12 to 400 volts which is commensurate with automotive batteries, for example.

EXAMPLE

Examples of the present invention are given below by way of illustration.

Example 1

Comparison I in terms of Conductive Layer Thickness

For the insulating layers and conductive layers, alumina and molybdenum disilicide were used as main components and blended as follows.

| | Alumina | Molybdenum disilicide |
|---|---|---|
| Conductive layer | 40 vol % | 60 vol % |
| Insulating layer | 100 vol % | 0 |
| Powder's mean particle size | 0.4 μm | 3 μm |
| Binder | methacrylic binder | |
| Solvent | toluene | |

The components were mixed in a ball mill for 24 hours to form slurries. Green sheets were formed from these slurries by a doctor blade technique. The sheets were stacked in a mold in a layer arrangement as shown in FIG. 1 (the number of stacked exothermic section conductive layers=26 layers) and compression molded at 60° C. and 1,000 kg/cm$^2$. Note that the sheets were formed on the basis of calculation such that the conductive layers in the exothermic and lead sections might have a thickness as shown in Table 1 after firing.

The compact was then cut to the structure shown in FIG. 1. The cut compact was subject to binder removal in a nitrogen gas atmosphere by heating to 350° C. at a rate of 1° C./min., holding at the temperature for 5 hours, then heating again to 900° C. at a rate of 5° C./min., holding at the temperature for 2 hours, and then cooling at 5° C./min. The binder-free compact was then fired in vacuum by heating to 1,400° C. at a rate of 5° C./min., holding at the temperature for 1 hour, heating to 1,750° C. at a rate of 5° C./min., holding at the temperature for 2 hours, and then cooling at a rate of 300° C./min. Below 800° C., spontaneous cooling took place.

By further effecting heat treatment in air at 1,500° C. for 4 hours, a silica protective layer of about 1 μm thick was formed on the surface of the conductor exposed at the element surface. Note that this heat treatment also served as a treatment for stabilizing electrical resistance as previously mentioned. The same applies in the following Examples.

Thereafter, portions of the protective layer where terminal electrodes were to be attached were abraded off by sand blasting and nickel electrodes were baked to those portions, obtaining rapid temperature rise heater element samples as shown in Table 1.

In sample No. 102 in Table 1, the layers of the exothermic and lead sections were prepared by a screen printing technique using the respective slurries.

In each sample, the exothermic section conductor and the lead section conductor had an electrical resistance ratio of 54:1. Also in each sample, the exothermic section insulating layer had a thickness of 25 μm.

The samples were measured for a temperature rise time from room temperature to 1,250° C. with a voltage of 20 V applied, a crack occurrence (cracked specimens per 100 specimens) by repeating 100,000 cycle tests each consisting of 10-second electric conduction and 10-second interruption, and a percent change of electrical resistance after holding at 1,500° C. for 100 hours. The results are shown in Table 1.

TABLE 1

Comparison I in terms of conductive layer thickness

| Sample No. | Conductive layer thickness: Exothermic section (μm) | Conductive layer thickness: Lead section (μm) | Conductive layer thickness: Lead/exothermic section | Number of stacked exothermic section conductive layers | Temp. rise time to 1250° C. (sec.) | Crack occurrence | Resistance change 1500° C./100 hr. (%) |
|---|---|---|---|---|---|---|---|
| 101* | 6* | 168 | 28 | 26 | 1 | 0 | −80 |
| 102 | 10 | 210 | 21 | 26 | 1 | 0 | −10 |
| 103 | 40 | 480 | 12 | 26 | 2 | 0 | −8 |
| 104 | 60 | 1280 | 21 | 26 | 2 | 0 | −5 |
| 105 | 120 | 2520 | 21 | 26 | 3 | 0 | −4 |
| 106 | 200 | 4200 | 21 | 26 | 5 | 0 | −2 |
| 107* | 250* | 5250 | 21 | 26 | unreached | 0 | — |
| 108* | 60 | 120 | 2* | 26 | 2 | 80 | −70 |
| 109 | 60 | 300 | 5 | 26 | 2 | 0 | −10 |
| 110* | 60 | 6500 | 108* | 26 | unreached | 0 | — |

*outside the preferred range

It is evident from Table 1 that sample Nos. 102 to 106 and 109 had a temperature rise time to 1,250° C. within 10 seconds, no crack occurrence, and a resistance change within 10%.

In contrast, those samples whose conductive layer had a thickness outside the preferred range failed to meet at least one of the requirements including a temperature rise time within 10 seconds, a crack occurrence of 0%, and a resistance change within 10%.

Example 2

Comparison II in terms of Conductive Layer Thickness

For the insulating layers and conductive layers, alumina, silica, and molybdenum disilicide were used as main components and blended as follows. Magnesia was added in an amount of 0.3% by weight based on silica and alumina combined. Note that part of alumina and silica were fed as mullite. Mullite consisted of silica and alumina in a molar ratio of 2:3.

| | Alumina | Mullite | Molybdenum disilicide |
|---|---|---|---|
| Conductive layer | 20 vol % | 20 vol % | 60 vol % |
| Insulating layer | 80 vol % | 20 vol % | 0 |
| Powder's mean particle size | 0.4 μm | 1.0 μm | 3 μm |
| Binder | | methacrylic binder | |
| Solvent | | toluene | |

Using these components, samples were prepared as in Example 1.

It is noted that in sample No. 202 in Table 2, the layers of the exothermic and lead sections were prepared by a screen printing technique using the respective slurries.

The samples were measured as in Example 1. The results are shown in Table 2.

TABLE 2

Comparison II in terms of conductive layer thickness

| Sample No. | Conductive layer thickness: Exothermic section (μm) | Lead section (μm) | Lead/ exothermic section | Number of stacked exothermic section conductive layers | Temp. rise time to 1250° C. (sec.) | Crack occurrence | Resistance change 1500° C./100 hr. (%) |
|---|---|---|---|---|---|---|---|
| 201* | 6* | 168 | 28 | 26 | 1 | 0 | −70 |
| 202 | 10 | 210 | 21 | 26 | 1 | 0 | −9 |
| 203 | 40 | 480 | 12 | 26 | 2 | 0 | −7 |
| 204 | 60 | 1280 | 21 | 26 | 2 | 0 | −4 |
| 205 | 120 | 2520 | 21 | 26 | 3 | 0 | −2 |
| 206 | 200 | 4200 | 21 | 26 | 5 | 0 | −1 |
| 207* | 250* | 5250 | 21 | 26 | unreached | 0 | — |
| 208* | 60 | 120 | 2* | 26 | 2 | 80 | −70 |
| 209 | 60 | 300 | 5 | 26 | 2 | 0 | −8 |
| 210* | 60 | 6500 | 108* | 26 | unreached | 0 | — |

*outside the preferred range

It is evident from Table 2 that sample Nos. 202 to 206 and 209 had a temperature rise time to 1,250° C. within 10 seconds, no crack occurrence, and a resistance change within 10%.

In contrast, those samples whose conductive layer had a thickness outside the preferred range failed to meet at least one of the requirements including a temperature rise time within 10 seconds, a crack occurrence of 0%, and a resistance change within 10%.

Example 3

Comparison in terms of the Number of Exothermic Section Conductive Layers

Samples as shown in Table 3 were prepared as in Example 1 except that the number of exothermic section conductive layers was changed as reported in Table 3, the exothermic section conductive layer had a thickness of 60 μm (except for sample No. 301 wherein the exothermic section conductive layer had a thickness of 400 μm), and the lead section conductive layer had a thickness of 1,280 μm.

These samples were measured as in Example 1. The results are shown in Table 3.

TABLE 3

Comparison in terms of the number of exothermic section conductive layers

| Sample No. | Number of stacked exothermic section conductive layers | Temp. rise time to 1250° C. (sec.) | Crack occurrence | Resistance change 1500° C./100 hr. (%) |
|---|---|---|---|---|
| 301** | 2** | 2 | 0 | −60 |
| 302 | 4 | 1 | 0 | −10 |
| 303 | 26 | 2 | 0 | −5 |
| 304 | 100 | 5 | 0 | −3 |
| 305* | 106* | unreached | 5 | — |

**outside the inventive range
*outside the preferred range

It is evident from Table 3 that sample Nos. 302 to 304 met all the requirements whereas those samples wherein the number of layers was outside the inventive range or the preferred range failed to meet at least one of the requirements.

Example 4

Comparison I in terms of Conductive Layer Composition

Samples as shown in Table 4 were prepared as in Example 1 except that the number of exothermic section conductive layers was 26 layers, the exothermic section conductive layer had a thickness of 60 μm, the lead section conductive layer had a thickness of 1,280 μm, and the conductors of the exothermic and lead sections had a percent volume occupation of alumina and molybdenum disilicide as reported in Table 4.

TABLE 4

Comparison I in terms of conductive layer composition

| Sample No. | Volume occupation in conductive layer: Alumina | Volume occupation in conductive layer: Molybdenum disilicide | Temp. rise time to 1250° C. (sec.) | Crack occurrence | Resistance change 1500° C./100 hr. (%) |
|---|---|---|---|---|---|
| 401* | 65 | 35* | 5 | 0 | +55 |
| 402 | 52 | 48 | 3 | 0 | −10 |
| 403 | 50 | 50 | 2 | 0 | −7 |
| 404 | 35 | 65 | 2 | 0 | −5 |
| 405 | 10 | 90 | 1 | 0 | −3 |
| 406* | 5 | 98* | 1 | 25 | −70 |

*outside the preferred range

It is evident from Table 4 that sample Nos. 402 to 405 met all the requirements whereas those samples wherein the percent volume occupation of molybdenum disilicide was outside the preferred range failed to meet at least one of the requirements.

Example 5

Comparison II in terms of Conductive Layer Composition

Samples as shown in Table 5 were prepared as in Example 4 except that the conductors of the exothermic and lead sections had a volume occupation by molybdenum disilicide of 65%, and titanium carbide and titanium boride were added as reported in Table 5. The amounts of titanium carbide and titanium boride added were expressed in percent based on alumina and molybdenum disilicide combined.

These samples were measured for an ultimate temperature upon application of 18 V (target: 1,150° C.) and a percent change of electrical resistance after holding at 1,500° C. for 100 hours. The results are shown in Table 5.

TABLE 5

Comparison II in terms of conductive layer composition

| Sample No. | Amount (wt %): Titanium carbide | Amount (wt %): Titanium boride | Ultimate temp. (°C.) with 18 V applied (target 1150° C.) | Resistance change 1500° C./100 hr. (%) |
|---|---|---|---|---|
| 501* | 0.005* | 0 | 1050 | −5 |
| 502 | 0.70 | 0 | 1260 | −5 |
| 503 | 2.00 | 0 | 1290 | −8 |
| 504* | 0 | 0.05* | 1050 | −6 |
| 505 | 0 | 0.1 | 1150 | −6 |
| 506 | 0 | 1.0 | 1260 | −6 |
| 507 | 0 | 2.0 | 1290 | −10 |
| 508* | 0 | 5.5* | 1310 | −35 |

*outside the preferred range

It is evident from Table 5 that sample Nos. 502, 503 and 505 to 507 met all the requirements whereas those samples wherein the amount of titanium carbide and titanium boride added was outside the preferred range failed to meet at least one of the requirements.

Example 6

Comparison in terms of Resistance Ratio of Exothermic Section Conductor to Lead Section Conductor Samples as shown in Table 6 were prepared as in Example 5 except that the resistance ratio of the exothermic section conductor to the lead section conductor was changed as shown in Table 6 by changing the cross-sectional area of the lead section conductor. These samples were measured as in Example 5. The results are shown in Table 6.

Note that 0.7% by weight of titanium carbide was added to the respective conductors of the exothermic and lead sections.

TABLE 6

Comparison in terms of resistance ratio of exothermic to lead section conductor

| Sample No. | Conductor resistance ratio (exothermic/lead section) | Ultimate temp. (°C.) with 18 V applied (target 1150° C.) | Resistance change 1500° C./100 hr. (%) |
|---|---|---|---|
| 601* | 1* | no rise | — |
| 602 | 5 | 1150 | −5 |
| 603 | 55 | 1260 | −5 |

*outside the preferred range

It is evident from Table 6 that sample Nos. 602 and 603 met all the requirements whereas those samples wherein the resistance ratio was outside the preferred range failed to meet at least one of the requirements. The element wherein the lead section conductor had a high electrical resistance was prevented from temperature rise because the energy was consumed in the lead section.

Example 7

Comparison in terms of Structure Sample of the Structure of FIG. 3

A sample was obtained as in Example 2 except that conductive layer sheets and insulating layer sheets were stacked so as to form the structure of FIG. 3. The exothermic section conductive layers were 40 $\mu$m thick, the upper and lower protective insulating layers were 25 $\mu$m thick, and the two conductive layers constituting each of the first and second protective conductive layers were 40 $\mu$m thick.

Sample of the structure of FIG. 4

A compact was prepared and cut as in Example 2 except that sheets were stacked such that insulating layers were disposed below the lowermost exothermic section conductive layer and above the uppermost exothermic section conductive layer, respectively. Insulating layer sheets were thermo-compression bonded to the cut sections where the exothermic section conductive layer sheets were exposed while avoiding entrapment of air bubbles. The assembly was subject to cold hydrostatic pressing at 50° C. and then to binder removal and other steps as in Example 2, obtaining a sample of the arrangement of FIG. 4. The protective layer was 25 $\mu$m thick.

Sample of the structure of FIGS. 3 and 4 combined

By combining the above two methods, a sample having the structure of FIGS. 3 and 4 combined was obtained.

On these samples, the following flame test was carried out.

Flame test

A combustion flame of LNG (gas pressure 280 $mmH_2O$) was laterally bent by a metallic flame guide so that the flame at its tip reached the exothermic section of the element. A time passed until the electrical resistance of the element changed 10% was measured.

As in the foregoing Examples, the samples were also measured for a temperature rise time and crack occurrence. For comparison purposes, the sample fabricated in Example 2 to the structure shown in FIG. 1 was also similarly tested and measured. The results are shown in Table 7.

TABLE 7

Comparison in terms of element structure

| Sample No. | Structure | Conductive layer thickness: Exothermic section (μm) | Conductive layer thickness: Lead section (μm) | Number of stacked exothermic section conductive layers | Temp. rise to 1250° C. (sec) | Crack occurrence | Flame test |
|---|---|---|---|---|---|---|---|
| 701 | FIGS. 3 + 4 | 10 | 210 | 26 | 2 | 0 | 6000 |
| 702 | FIGS. 3+ 4 | 40 | 480 | 26 | 3 | 0 | 10000 |
| 703 | FIG. 3 | 40 | 480 | 26 | 3 | 0 | 4000 |
| 704 | FIG. 4 | 40 | 480 | 26 | 3 | 0 | 9000 |
| 705 | FIG. 1 | 40 | 480 | 26 | 3 | 0 | 300 |

It is evident from Table 7 that the structures of FIGS. 3 and 4 improve durability.

The effectiveness of the invention is evident from the results of the foregoing Examples.

BENEFITS

As mentioned above, the rapid temperature rise heater element of the invention is simple and inexpensive to fabricate, excellent in performance, and fully durable.

We claim:

1. A rapid temperature rise heater element comprising an exothermic section and a lead section, said exothermic section comprising an exothermic section conductor of ceramic material which includes at least four stacked exothermic section conductive layers with an exothermic section insulating layer of ceramic material interposed therebetween and exothermic section conductive layer connections each for connecting adjacent exothermic section conductive layers, each of the exothermic section conductive layers excluding the uppermost and lowermost ones being electrically connected at one end to an upper adjacent exothermic section conductive layer and at another end to a lower adjacent exothermic section conductive layer so that the exothermic section conductive layer is alternately folded as a whole, said lead section comprising a lead section conductor of ceramic material which includes first and second lead section conductive layers electrically connected to the uppermost and lowermost exothermic section conductive layers, the first and second lead section conductive layers being stacked with a lead section insulating layer of ceramic material interposed therebetween.

2. The rapid temperature rise heater element of claim 1 wherein the exothermic section conductive layer has a thickness of 10 to 200 μm, and the first and second lead section conductive layers each have a thickness which is greater than the thickness of the exothermic section conductive layer by a factor of 3 to 100.

3. The rapid temperature rise heater element of claim 1 wherein the exothermic section and lead section conductors contain molybdenum disilicide and alumina or molybdenum disilicide, alumina, and silica, the molybdenum disilicide being present in a percent volume occupation of 48 to 97%.

4. The rapid temperature rise heater element of claim 3 wherein the percent volume occupation of molybdenum disilicide in the exothermic section conductor divided by the percent volume occupation of molybdenum disilicide in the lead section conductor ranges from 0.53 to 1.0.

5. The rapid temperature rise heater element of claim 3 wherein the exothermic section conductor, or the lead section conductor, or both contains at least one of titanium carbide and titanium boride, the amount of titanium carbide and titanium boride combined being 0.1 to 5% by weight based on the amount of molybdenum disilicide, alumina, and silica combined.

6. The rapid temperature rise heater element of claim 1 wherein the exothermic section conductor has an electrical resistance which is greater than the resistance of the lead section conductor by a factor of at least 5.

7. The rapid temperature rise heater element of claim 1 wherein at least the portion of the exothermic section surface where the exothermic section conductor is exposed is coated with a protective layer.

8. The rapid temperature rise heater element of claim 7 wherein at least the portion of the lead section surface where the lead section conductor is exposed is coated with a protective layer.

9. The rapid temperature rise heater element of claim 1 wherein first and second protective conductive layers are stacked above and below the uppermost and lowermost exothermic section conductive layers, respectively, with an insulating layer interposed therebetween, the uppermost exothermic section conductive layer is connected to the first lead section conductive layer through the first protective conductive layer, the lowermost exothermic section conductive layer is connected to the second lead section conductive layer through the second protective conductive layer, and each of the first and second protective conductive layers consists of two stacked conductive layers with a protective insulating layer interposed therebetween, the two conductive layers being in parallel connection.

10. The rapid temperature rise heater element of claim 1 which is manufactured by alternately laying conductive ceramic material layers and electrically insulating ceramic material layers, followed by cutting and firing.

11. The rapid temperature rise heater element of claim 10 which is manufactured by alternately laying conductive ceramic material layers and electrically insulating ceramic material layers such that the conductive layer is enclosed with the insulating layer, followed by firing, at least the surface of the exothermic section being coated with a protective layer.

* * * * *